US012629637B2

(12) United States Patent
Fuse et al.

(10) Patent No.: US 12,629,637 B2
(45) Date of Patent: May 19, 2026

(54) DEGASSING APPARATUS

(71) Applicant: DIC Corporation, Tokyo (JP)

(72) Inventors: Takaaki Fuse, Ichihara (JP); Kazumi Oi, Ichihara (JP); Naoki Hada, Ichihara (JP); Youhei Suganuma, Ichihara (JP); Kazuyasu Kawashima, Ichihara (JP); Akira Sato, Ichihara (JP)

(73) Assignee: DIC Corporation, Tokyo (JP)

( * ) Notice: Subject to any disclaimer, the term of this patent is extended or adjusted under 35 U.S.C. 154(b) by 333 days.

(21) Appl. No.: 18/269,008

(22) PCT Filed: Dec. 16, 2021

(86) PCT No.: PCT/JP2021/046415

§ 371 (c)(1),
(2) Date: Jun. 22, 2023

(87) PCT Pub. No.: WO2022/138415

PCT Pub. Date: Jun. 30, 2022

(65) Prior Publication Data

US 2024/0075411 A1 Mar. 7, 2024

(30) Foreign Application Priority Data

Dec. 24, 2020 (JP) ................................ 2020-214694

(51) Int. Cl.
*B01D 63/06* (2006.01)
*B01D 19/00* (2006.01)
(Continued)

(52) U.S. Cl.
CPC ....... *B01D 63/069* (2022.08); *B01D 19/0031* (2013.01); *B01D 19/0063* (2013.01);
(Continued)

(58) Field of Classification Search
CPC B01D 19/0031; B01D 19/0063; B01D 61/00; B01D 63/069; B01D 63/046;
(Continued)

(56) References Cited

U.S. PATENT DOCUMENTS 4,352,643 A * 10/1982 Iijima .................... H01J 37/18 62/297
5,205,844 A * 4/1993 Morikawa .......... B01D 19/0063 96/6

(Continued)

FOREIGN PATENT DOCUMENTS

JP 2007/094242 A 4/2007

*Primary Examiner* — Charles G Freay
(74) *Attorney, Agent, or Firm* — Troutman Pepper Locke LLP

(57) ABSTRACT

A degassing apparatus capable of preventing cross-contamination is provided. A degassing apparatus includes degassing modules each having a tube unit that is a gas permeable membrane separating a fluid circulation space and a reduced-pressure space from each other, vacuum piping communicatively connected to the reduced-pressure spaces, a discharge device that discharges gas in the reduced-pressure spaces through the vacuum piping, atmospheric release piping communicatively connected to the reduced-pressure spaces, an atmospheric release valve capable of introducing atmosphere into the reduced-pressure spaces through the atmospheric release piping, and a control unit that controls the operation of the discharge device and the atmospheric release valve. The control unit performs control to close the atmospheric release valve to perform a process of discharging gas in the reduced-pressure spaces by the discharge device when a degassing process is being performed, and performs control to open the atmospheric release valve to open the reduced-pressure spaces.

20 Claims, 5 Drawing Sheets

(51) Int. Cl.
*B01D 61/00* (2006.01)
*B01D 63/02* (2006.01)
*B01D 63/04* (2006.01)
*B01D 69/04* (2006.01)

(52) U.S. Cl.
CPC ......... *B01D 61/00* (2013.01); *B01D 63/0241* (2022.08); *B01D 63/046* (2013.01); *B01D 69/04* (2013.01); *B01D 2313/10* (2013.01); *B01D 2313/12* (2013.01); *B01D 2313/13* (2013.01)

(58) Field of Classification Search
CPC ............ B01D 63/0241; B01D 2313/10; B01D 2313/12; B01D 2313/13
USPC ........................................ 96/8, 174; 417/363
See application file for complete search history.

(56) References Cited

U.S. PATENT DOCUMENTS

| | | | | |
|---|---|---|---|---|
| 8,668,763 | B2 * | 3/2014 | Gerner | B01D 61/3621 138/40 |
| 2010/0288024 | A1 * | 11/2010 | Sugiyama | B01D 19/0063 210/120 |

* cited by examiner 1
4
2
80
85
86
46
60
63
64
65
43
44
70
30
20
10
61
62
66
41
42
45
40
75
50
5
3

DEGASSING APPARATUS

TECHNICAL FIELD

The present invention relates to a degassing apparatus, and particularly to a degassing apparatus with a plurality of degassing modules.

BACKGROUND ART

PTL 1 and PTL 2 disclose a degassing apparatus used in a liquid chromatography device and the like.

CITATION LIST

Patent Literature

PTL 1: WO 2007/094242

SUMMARY OF INVENTION

Technical Problem

The degassing apparatus described in PTL 1 has a valve between a reduced-pressure space in a degassing module and a vacuum pump and is configured to gradually return the reduced-pressure space in the degassing module to the atmospheric pressure after the device stops operation. However, in the case of a degassing apparatus with a plurality of degassing modules, if only one valve is used to gradually open to the atmosphere, the degree of depressurization varies among the degassing modules for a longer time. This tends to cause cross-contamination in which vaporized gas is mixed in another degassing module. On the other hand, if individual valves are installed in the degassing modules to eliminate such a time difference, the device configuration becomes more complex or the manufacturing cost increases due to the increased number of components.

An object according to an aspect of the present invention is to provide a degassing apparatus that can prevent cross-contamination.

Solution to Problem

A degassing apparatus according to an aspect of the present invention includes: a first degassing module and a second degassing module, each having a gas permeable membrane to separate a fluid circulation space and a reduced-pressure space from each other; vacuum piping having discharge piping sections continuous to respective discharge ports of the first degassing module and the second degassing module, and a discharge assembly section configured to assemble the discharge piping sections, the vacuum piping being communicatively connected to the respective reduced-pressure spaces of the first degassing module and the second degassing module; a discharge device communicatively connected to the vacuum piping and configured to discharge gas in the respective reduced-pressure spaces to outside through the vacuum piping; atmospheric release piping having release piping sections continuous to respective release ports of the first degassing module and the second degassing module, and a release assembly section configured to assemble the release piping sections, the atmospheric release piping being communicatively connected to the respective reduced-pressure spaces of the first degassing module and the second degassing module; an atmospheric release valve communicatively connected to the atmospheric release piping and capable of introducing atmosphere into the respective reduced-pressure spaces through the atmospheric release piping; and a control unit configured to control operation of the discharge device and the atmospheric release valve. The control unit performs control to close the atmospheric release valve to perform a process of discharging gas in the respective reduced-pressure spaces by the discharge device when a degassing process is being performed in at least one of the first degassing module and the second degassing module, and performs control to open the atmospheric release valve to open the respective reduced-pressure spaces to the atmosphere at once after the degassing process is finished.

In this degassing apparatus, the vacuum piping for discharging the atmosphere from the reduced-pressure spaces of the degassing modules and the atmospheric release piping for opening the reduced-pressure spaces to the atmosphere are provided separately, and after the degassing process in the degassing module is finished, the atmospheric release valve is opened to open the reduced-pressure spaces to the atmosphere at once. With this configuration, there is almost no time to cause variations in the degree of depressurization among the degassing modules when they are opened to the atmosphere, and the occurrence of cross-contamination can be suppressed.

The above degassing apparatus may further include a detector for detecting the degree of depressurization in the reduced-pressure space, and the vacuum piping may further have a detection piping section communicatively connected to the detector. With this configuration, the degree of depressurization in the reduced-pressure spaces of the degassing modules can be detected more accurately, and a stable degassing process by the control unit can be achieved. In this configuration, it is preferable that the detector has a diaphragm for detecting the degree of depressurization, and the detector is installed such that a detection surface of the diaphragm faces downward. Vaporized gas may sometimes enter the vacuum piping, but the detection surface of the diaphragm faces downward to prevent gas intrusion from the vacuum piping from remaining attached to the detection surface. In particular, when the gas is a corrosive medium gas, such a configuration can be employed to suppress deterioration of the detection surface and enable stable detection of the degree of depressurization over a long period of time.

It is preferable that the above degassing apparatus further includes a bottom plate defining a bottom of the degassing apparatus, and the discharge device is disposed on the bottom plate with anti-vibration means interposed therebetween. The discharge device may sometimes generate vibrations with the pump mechanism or the like and such vibrations may damage the gas permeable membranes (e.g., hollow fiber membranes) that constitute the degassing modules in the degassing apparatus. The vibrations may also cause microbubbles in a fluid flowing in the degassing modules to affect the test. However, the provision of such anti-vibration means can suppress transmission of vibrations of the discharge device to other components and suppress the damage to the gas permeable membranes and the growth of microbubbles in the test fluid. The discharge device may be supported on the bottom plate by a plurality of legs and positioned at a predetermined height from a surface of the bottom plate. This configuration can further suppress transmission of vibrations from the discharge device to other components and, in addition, can prevent erosion of the discharge device by a fluid to be degassed in the degassing apparatus even if the fluid leaks from the degassing modules.

Even if such leakage occurs, liquid waste disposal can be easily performed. The anti-vibration means may be provided between a plurality of legs and the discharge device.

It is preferable that the above degassing apparatus further includes a bottom plate defining a bottom of the degassing apparatus, and at least one of the control unit and the atmospheric release valve is disposed at a predetermined height from a surface of the bottom plate. This configuration can prevent erosion of the control unit and the atmospheric release valve by a fluid to be degassed in the degassing apparatus even if the fluid leaks from the degassing modules. Even if such leakage occurs, liquid waste disposal can be easily performed.

In the above degassing apparatus, it is preferable that at least a portion of at least one of the vacuum piping and the atmospheric release piping is formed of a resin tube, and the resin tube has a rubber hardness in a range of 70±30 degrees, and the resin tube has an oxygen permeability of 6000 $cc(STP)cm/cm^2/sec/cmHg \times 10^{-10}$ or less. This configuration can prevent erosion of the piping by vaporized gas (chemical resistance), makes it easier to arrange the piping (flexibility), and can easily increase or stabilize the degree of depressurization by the discharge device (gas permeability).

In the above degassing apparatus, the first degassing module may have a housing having an opening and accommodating the gas permeable membrane in a tubular shape, a lid configured to hermetically seal the opening and allow the gas permeable membrane in a tubular shape to penetrate from inside toward outside of the housing, and a connector portion connecting and fixing the gas permeable membrane in a tubular shape to the lid while maintaining airtightness of the reduced-pressure space in a region where the gas permeable membrane penetrates. The connector portion may include a support member disposed inside the gas permeable membrane in a tubular shape to support the gas permeable membrane in a tubular shape from the inside when connected and fixed to the lid. This configuration can prevent membrane breakage at the fixing and connection portion of the degassing module. In particular, when the gas permeable membrane is a tubular hollow fiber membrane, membrane breakage is likely to occur during transportation or due to vibrations, but this configuration can prevent membrane breakage. As a result, the reduced-pressure space separated by the gas permeable membrane can be closed more reliably, so that the depressurization by the discharge device can be stabilized more.

In the above degassing apparatus, it is preferable that the atmospheric release piping is disposed above the vacuum piping. With this configuration, since the reduced-pressure space is opened to the atmosphere by the atmosphere introduced from above, vaporized gas is less likely to move to other regions, and as a result, cross-contamination can be further suppressed.

The above degassing apparatus may further include a regulating valve disposed between the degassing module and the discharge device to regulate the degree of depressurization in the reduced-pressure space. The control unit may perform control to close the regulating valve and stop operation of the discharge device when the degree of depressurization in the reduced-pressure space is within a predetermined range. With this configuration, the operation of the discharge device can be stopped as necessary to further suppress the vibration-induced damage and the growth of microbubbles.

In the above degassing apparatus, after the degassing process is finished, the control unit may perform control to open the atmospheric release valve to open the respective reduced-pressure spaces to atmosphere at once while gas discharge operation by the discharge device continues for a predetermined time. With this control, the reduced-pressure spaces can be smoothly opened to the atmosphere by the atmospheric release valve.

Advantageous Effects of Invention

According to an aspect of the present invention, cross-contamination can be prevented.

DESCRIPTION OF EMBODIMENTS

A degassing apparatus of an embodiment will be described in detail below with reference to the drawings. In all of the drawings, the same or corresponding parts are denoted by the same reference signs and an overlapping description will be omitted.

Figure 1:
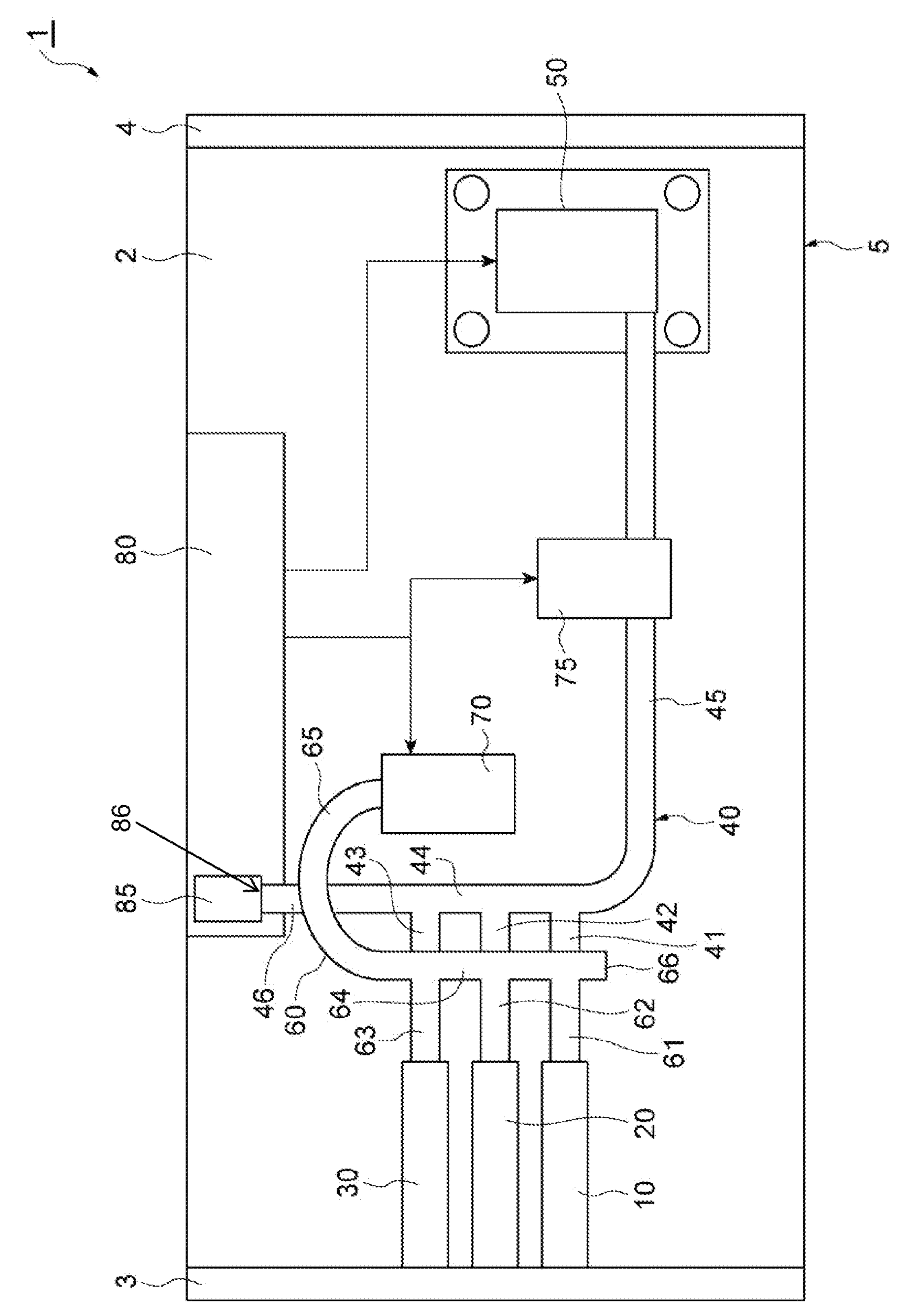
FIG. 1 is a schematic plan view of a degassing apparatus according to an embodiment of the present invention.
Figure 2:
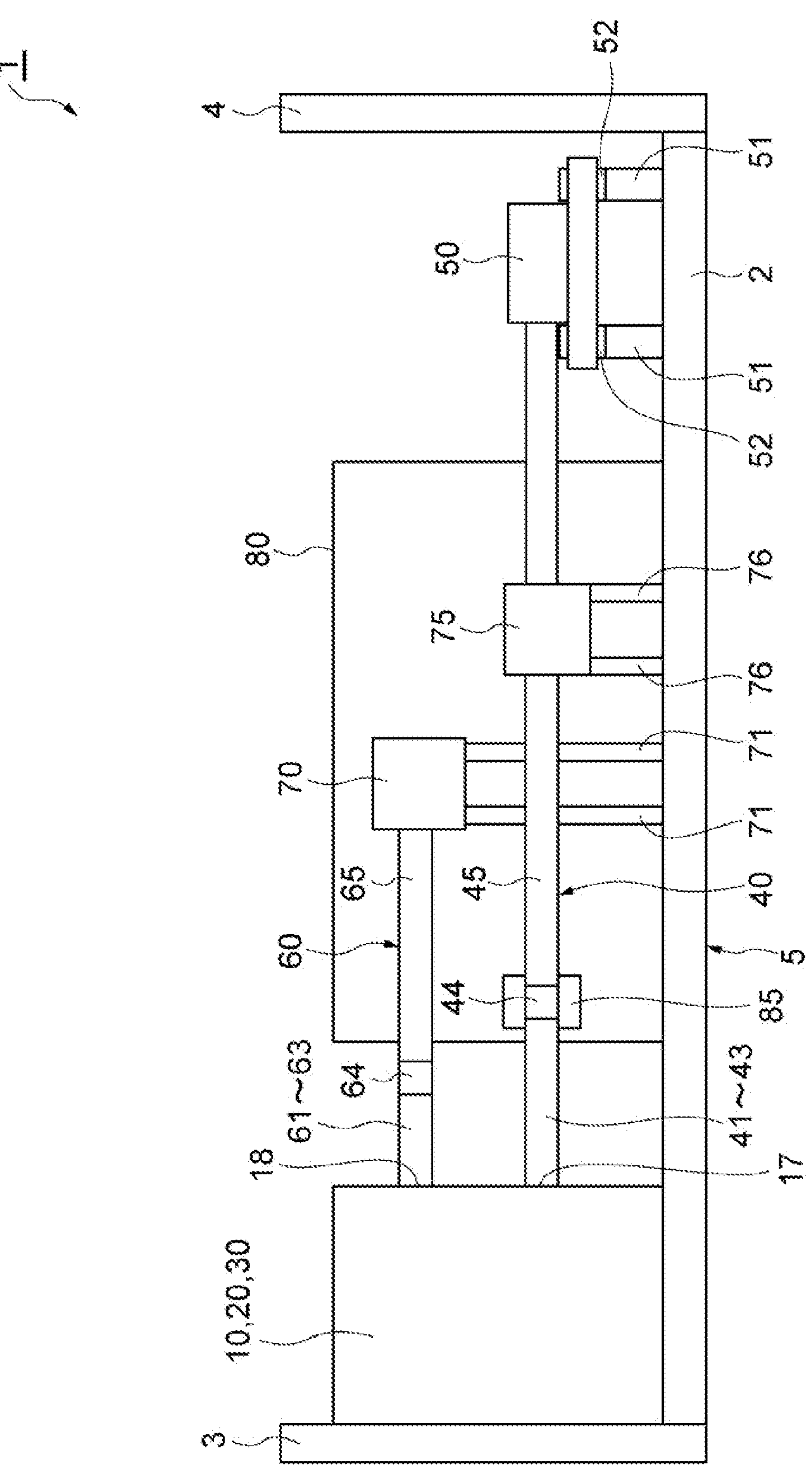
FIG. 2 is a schematic side view of the degassing apparatus illustrated in FIG. 1.

FIG. 1 is a schematic plan view of a degassing apparatus according to an embodiment. FIG. 2 is a schematic side view of the degassing apparatus illustrated in FIG. 1. As illustrated in FIG. 1 and FIG. 2, a degassing apparatus 1 includes a housing 5 having a bottom plate 2, a front plate 3, and a rear plate 4, degassing modules 10, 20, and 30 (first and second degassing modules), vacuum piping 40, a discharge device 50, atmospheric release piping 60, an atmospheric release valve 70, a regulating valve 75, and a control unit 80. The degassing apparatus 1 is, for example, a degassing apparatus for liquid chromatography and performs a degassing process on a fluid to be tested in liquid chromatography. The degassing apparatus 1 may be used for gas chromatography, biochemical analyzers, inkjet filling devices, and the like, as a matter of course.

Figure 3:
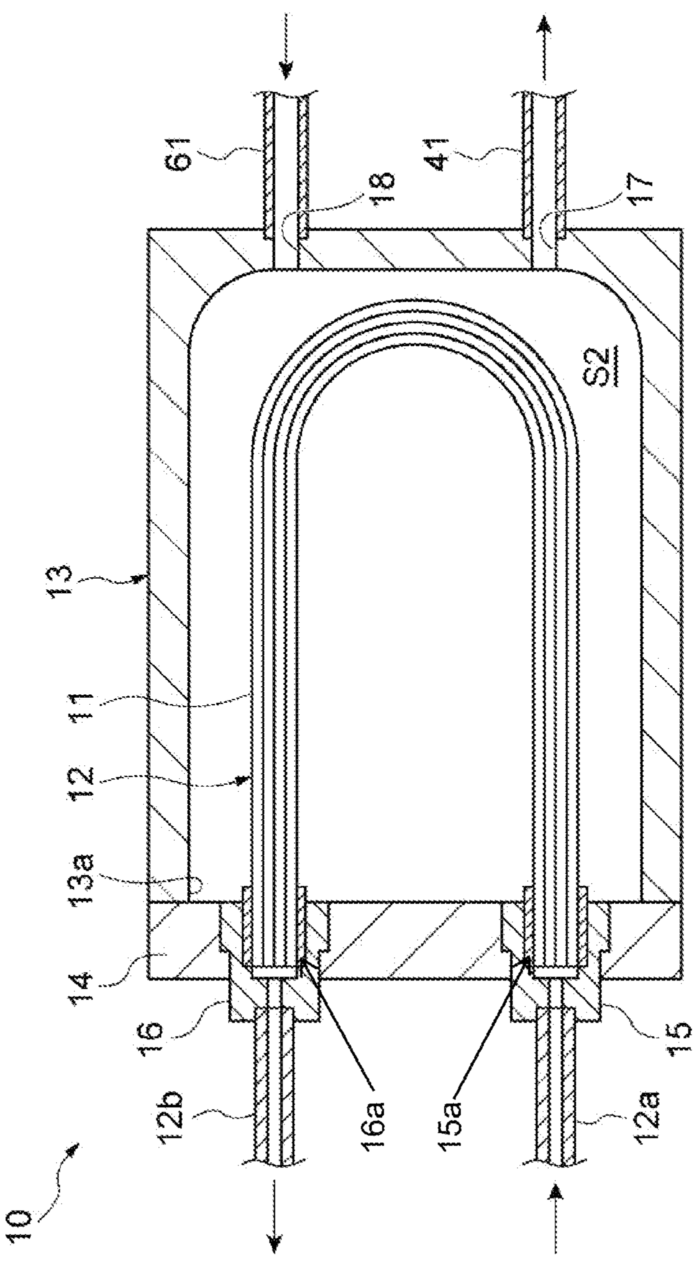
FIG. 3 is a schematic cross-sectional view of an example of a degassing module installed in the degassing apparatus illustrated in FIG. 1.
Figure 4:
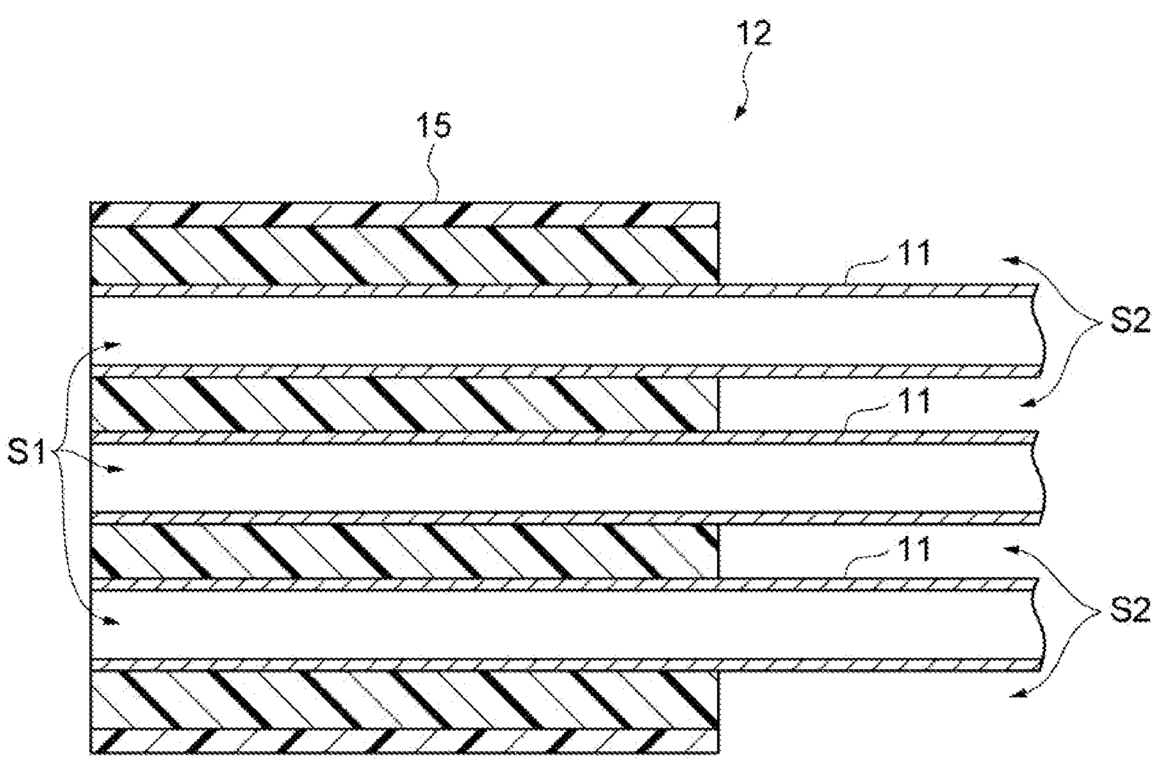
FIG. 4 is an enlarged cross-sectional view of a section around a connector portion of the degassing module illustrated in FIG. 3.

The degassing modules 10, 20, and 30 have a configuration, for example, illustrated in FIG. 3. FIG. 3 is a schematic cross-sectional view of an example of the degassing module installed in the degassing apparatus illustrated in FIG. 1. FIG. 4 is an enlarged cross-sectional view of a section around a connector portion of the degassing module illustrated in FIG. 3. FIG. 3 illustrates a configuration of the degassing module 10 as an example, and the other degassing modules 20 and 30 have a similar configuration. As illustrated in FIG. 3 and FIG. 4, the degassing module 10 has a tube unit 12 with a plurality of tubes 11 bundled at both ends, each tube 11 defining a fluid circulation space S1 in the inside, a housing 13 that accommodates the tube unit 12, a lid 14 that hermetically seals an opening 13*a* of the housing 13, connector portions 15 and 16 that connect and fix the tube unit 12 penetrating through the lid 14, and a discharge port 17 and a release port 18 communicatively connected to a reduced-pressure space S2.

In the degassing module 10, the tube unit 12 which is gas permeable membranes divides the inside of the housing 13 into the fluid circulation space S1 which is an interior space of each of the tubes 11 of the tube unit 12 and the reduced-pressure space S2 which is a space outside the tube unit 12. The fluid circulation space S1 is a region where a liquid is supplied, and the liquid introduced from an inlet port 12*a* of the tube unit 12 is supplied to a discharge port 12*b*. The reduced-pressure space S2 is a region where the internal atmosphere is sucked. In the degassing module 10, a liquid is supplied to the fluid circulation space S1 which is the interior space of each of the tubes 11, and a gas is sucked from the reduced-pressure space S2 outside the tubes 11, whereby the liquid supplied to the tube unit 12 is degassed.

Each of the tubes 11 that constitute the tube unit 12 is a tubular membrane that allows a gas to pass through but does not allow a liquid to pass through (see FIG. 4). The material, membrane shape, membrane form, and the like of the tube 11 are not limited. Examples of the material of the tube 11 include fluororesins such as polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-ethylene copolymer (ethylene copolymer) (ETFE), polychlorotrifluoroethylene (PCTFE), amorphous fluoropolymer (AF), and polyvinylidene fluoride (PVDF), polypropylene (PP), polymethylpentene (PMP), silicone, polyimide, and polyamide. An example of the amorphous fluoropolymer may be Teflon (registered trademark) AF.

In the degassing apparatus 1, three degassing modules 10, 20, and 30 in such a manner are arranged, but two degassing modules may be arranged, or four or more degassing modules may be arranged.

Returning to FIG. 1 and FIG. 2, the description will be further given. As illustrated in FIG. 1 and FIG. 2, the vacuum piping 40 is a member communicatively connected to the respective reduced-pressure spaces S2 of the degassing modules 10, 20, and 30 to connect the reduced-pressure spaces S2 to the discharge device 50. The vacuum piping 40 has discharge piping sections 41 to 43 continuous to the respective discharge ports 17 of the degassing modules 10, 20, and 30, a discharge assembly section 44 for assembling the discharge piping sections 41 to 43, piping 45 connecting the discharge assembly section 44 to the discharge device, and a detection piping section 46 communicatively connecting the discharge assembly section 44 to the detector 85. As will be described later, the detector 85 is a barometric pressure sensor that detects the degree of depressurization in the respective reduced-pressure spaces S2 of the degassing modules 10, 20, and 30 and is provided in the control unit 80.

At least some of the discharge piping sections 41 to 43, the discharge assembly section 44, the piping 45, and the detection piping section 46 that constitute the vacuum piping 40 are formed of, for example, resin tubes. All or almost all (e.g., excluding a joint portion) of the constituent members of the vacuum piping 40 may be formed of resin tubes. In other words, a plurality of tubes may be coupled using joint members or the like to constitute the vacuum piping 40. Such a tube is resistant to a solvent used in liquid chromatography and is formed of piping, for example, having a rubber hardness of preferably in the range of 70±30 degrees and an oxygen permeability of 6000 cc(STP)cm/cm$^2$/sec/cmHg×10$^{-10}$ or less. The rubber hardness is preferably in the range of 70±30 degrees. In order to achieve both of appropriate flexibility to prevent loosening or disconnection at a joint portion and appropriate durability to suppress deformation, crushing, or blockage of the tubes, the lower limit is more preferably 50 degrees or more, even more preferably 55 degrees or more, particularly preferably 60 degrees or more, and the upper limit is more preferably 95 degrees or less, even more preferably 80 degrees or less, and particularly preferably 75 degrees or less. It is noted that the rubber hardness represents Shore A and can be measured, for example, with a durometer (type A) in accordance with JIS K7312 (1996). In terms of excellent durability, the oxygen permeability is preferably 6000 cc (STP)cm/cm$^2$/sec/cmHg×10$^{-10}$ or less, more preferably 3000 cc(STP)cm/cm$^2$/sec/cmHg×10$^{-10}$ or less, even more preferably 1000 cc(STP)cm/cm$^2$/sec/cmHg×10$^{-10}$ or less, particularly preferably 500 cc(STP)cm/cm$^2$/sec/cmHg×10$^{-10}$ or less, and preferably 0.1 cc(STP)cm/cm$^2$/sec/cmHg×10$^{-10}$ or more, more preferably 10 cc(STP)cm/cm$^2$/sec/cmHg×10$^{-10}$ or more. It is noted that the oxygen permeability represents the oxygen transmission rate and can be measured, for example, in accordance with the ASTM D 1434 Standard.

The material of the tubes that constitute the vacuum piping 40 is not limited as long as it has the properties described above. Examples include vinyl chloride, silicone rubber; polyamides (nylon) such as nylon 6, nylon 66, nylon 11, and nylon 12; polyurethanes; polyolefins such as polyethylene such as low-density polyethylene and linear low-density polyethylene, and polypropylene; fluororesins such as FEP, PFA, ETFE, and PTFE; and thermoplastic elastomers such as polyester thermoplastic elastomers, styrene thermoplastic elastomers, and olefin thermoplastic elastomers. One or two or more kinds of these can be used. Among the materials described above, a resin composition containing polyolefin and a thermoplastic elastomer is more preferred as the material of the tubes that constitute the vacuum piping 40, and a resin composition containing polyolefin and a styrene thermoplastic elastomer is even more preferred.

The vacuum piping 40 formed of the resin composition containing polyolefin and a thermoplastic elastomer described above has not only excellent solvent resistance but also low gas permeability. The vacuum piping 40 formed of the resin composition containing polyolefin and a thermoplastic elastomer described above has appropriate flexibility and has excellent durability, because loosening or disconnection at a joint portion of the discharge assembly section 44 during degassing operation is prevented and deformation, crushing, or blockage of the tubes is suppressed. Further, the degassing apparatus 1 according to the present embodiment includes a plurality of degassing modules and has many joint configurations such as joint portions between the vacuum piping 40 and the degassing modules 10, 20, and 30 and joint portions of the discharge assembly section 44 with other parts, and the configuration having the tubes with such flexibility and durability can also improve the long-term reliability of the degassing apparatus.

The styrene thermoplastic elastomer used for the vacuum piping 40 is a copolymer having at least one styrene block (hard segment) and at least one elastomer block. Vinylpolydiene, polyisoprene, polybutadiene, polyethylene, polychloroprene, poly(2,3-dimethylbutadiene), or the like is preferably used as the elastomer block. The elastomer block may be hydrogenated. It is preferable that the elastomer block is hydrogenated, because if so, the solvent resistance and the chemical-resistant performance tend to be higher. Specific examples of the styrene thermoplastic elastomer include styrene-vinylisoprene-styrene triblock copolymer (SIS), styrene-isobutylene diblock copolymer (SIB), styrene-butadiene-styrene triblock copolymer (SBS), styrene-ethylene/butene-styrene triblock copolymer (SEBS), styrene-ethylene/propylene-styrene triblock copolymer (SEPS), styrene-ethylene/ethylene/propylene-styrene triblock copolymer (SEEPS), and styrene-butadiene/butylene-styrene triblock copolymer (SBBS). The styrene thermoplastic elastomers may be used alone or in combination of two or more. Among these, styrene-vinylisoprene-styrene triblock copolymer is preferred because of its superior solvent resistance and chemical-resistant performance. Suitable examples of such styrene-vinylisoprene-styrene triblock copolymer include "FG1901 G Polymer" and "FG1924 G Polymer" available from KRATON CORPORATION and HYBRAR 5127 available from Kuraray Co., Ltd. The hydrogenated vinylisoprene block, HYBRAR 7311, available from Kuraray Co., Ltd. is also suitable.

The lower limit of the range of the amount of styrene block (styrene content) in the styrene thermoplastic elastomer is preferably 1% by mass, more preferably 5% by mass, and even more preferably 10% by mass of the total of styrene block and elastomer block. In this range, higher solvent resistance and chemical-resistant performance tend to be achieved. On the other hand, the upper limit is preferably 30% by mass and more preferably 20% by mass of the total of styrene block and elastomer block. In this range, solvent resistance and chemical-resistant performance tend to be more excellent.

The lower limit of the range of the amount of styrene thermoplastic elastomer in the resin composition containing polyolefin and a styrene thermoplastic elastomer is preferably 3% by mass, more preferably 5% by mass, and even more preferably 10% by mass of the total of polyolefin and styrene thermoplastic elastomer. In this range, higher solvent resistance and chemical-resistant performance tend to be achieved. On the other hand, the upper limit is preferably 30% by mass, more preferably 25% by mass, and even more preferably 20% by mass of the total of polyolefin and styrene thermoplastic elastomer. In this range, high solvent resistance and chemical-resistant performance tend to be achieved.

In the discharge assembly section 44, the joint portion that couples the tubes to each other may be formed of hard plastic (polypropylene) or the like.

The discharge device 50 is communicatively connected to the reduced-pressure spaces S2 of the degassing modules 10, 20, and 30 through the vacuum piping 40 and discharges the gas in the reduced-pressure spaces S2 to the outside based on control instructions from the control unit 80. The discharge device 50 includes a pump, and for example, a diaphragm-type dry vacuum pump is used. The discharge device 50 is supported on the upper surface of the bottom plate 2 of the housing 5 by a plurality of legs 51 (e.g., four legs 51) and is arranged at a predetermined height from the upper surface of the bottom plate 2. Anti-vibration means 52 such as anti-vibration rubber or anti-vibration gel is arranged between the discharge device 50 and the legs 51 to attenuate vibrations generated by the discharge device 50. It is preferable that the anti-vibration means 52 is set to be able to attenuate, for example, vibrations of 50 Hz or higher as a vibration frequency. The discharge device 50 is raised away from the bottom plate 2 by the legs 51.

The atmospheric release piping 60 is a member communicatively connected to the respective reduced-pressure spaces S2 of the degassing modules 10, 20, and 30 to connect the reduced-pressure spaces S2 to the atmospheric release valve 70. The atmospheric release piping 60 has release piping sections 61 to 63 continuous to the respective release ports 18 of the degassing modules 10, 20, and 30, a release assembly section 64 for assembling the release piping sections 61 to 63, and piping 65 connecting the release assembly section 64 to the atmospheric release valve 70. An end 66 opposite to the piping 65 of the release assembly section 64 of the atmospheric release piping 60 is closed. The atmospheric release piping 60 is formed of the same material as the vacuum piping 40, for example, resin tubes. More specifically, at least some of the release piping sections 61 to 63, the release assembly section 64, and the piping 65 that constitute the atmospheric release piping 60 are formed of, for example, resin tubes as described above. All or almost all (e.g., excluding a joint portion) of the constituent members of the atmospheric release piping 60 may be formed of resin tubes. In other words, a plurality of resin tubes may be coupled using joint members or the like to constitute the atmospheric release piping 60. Such a resin tube is resistant to a solvent used in liquid chromatography and is formed of piping having a rubber hardness in the range of 70±30 degrees and an oxygen permeability of 6000 cc(STP)cm/cm$^2$/sec/cmHg$\times 10^{-10}$ or less. The joint portion of the release assembly section 64 may be formed of hard plastic (e.g., polypropylene) or the like, in the same manner as the joint portion of the discharge assembly section 44.

The atmospheric release valve 70 is a solenoid valve communicatively connected to one end of the atmospheric release piping 60 and capable of introducing the atmosphere into the respective reduced-pressure spaces S2 of the degassing modules 10, 20, and 30 at once through the atmospheric release piping 60, based on control instructions from the control unit 80. When a degassing process in the degassing modules 10, 20, and 30 is finished, for example, the atmospheric release valve 70 opens the solenoid valve from the closed state (CLOSE) to the open state (OPEN) within five seconds, based on control instructions from the control unit 80, and opens the reduced-pressure spaces S2 (for example, 1 L containers) to the atmosphere within one minute.

The regulating valve 75 is a solenoid valve arranged between the degassing modules 10, 20, and 30 and the discharge device 50 to regulate the degree of depressurization in the reduced-pressure spaces S2. The regulating valve 75 opens the valve when a depressurization process in the reduced-pressure spaces S2 by the discharge device 50 is being performed, and closes the valve based on control instructions from the control unit 80 when the degree of depressurization in the reduced-pressure spaces S2 falls within a predetermined range. In this case, the discharge device 50 can stop its discharge operation. On the other hand, when the degree of depressurization in the reduced-pressure spaces S2 subsequently falls outside the predetermined range, the valve is opened based on control instructions from the control unit 80. Both the atmospheric release valve 70 and the regulating valve 75 are raised to a predetermined height from the bottom plate 2 of the housing 5 by a plurality of legs 71 and 76.

The control unit 80 has the detector 85 to detect the degree of depressurization in the reduced-pressure spaces S2 and controls the operation of the discharge device 50 and the regulating valve 75 based on the detected degree of depressurization. In this control, the atmosphere is discharged by the discharge device 50 so that the degree of depressurization detected by the detector 85 attains a predetermined value, and when the degree of depressurization in the reduced-pressure spaces S2 falls within the predetermined range, the regulating valve 75 is closed and the operation of the discharge device 50 is stopped. When the degree of depressurization detected by the detector 85 falls outside the predetermined range after the regulating valve 75 is closed, the control unit 80 brings the discharge device 50 into operation again to perform a discharge process.

On the other hand, when the degassing process is finished by the degassing modules 10, 20, and 30, the control unit 80 controls the operation of the discharge device 50 and the atmospheric release valve 70 based on a stop instruction, for example, from the outside. In this control, after the degassing process is finished, the atmospheric release valve 70 is opened to open the reduced-pressure spaces S2 to the atmosphere at once. After the degassing process is finished, control may be performed such that the atmospheric release valve 70 is opened to open the reduced-pressure spaces S2 to the atmosphere at once while the gas discharge operation by the discharge device 50 continues for a predetermined time (e.g., a few seconds).

Figure 5:
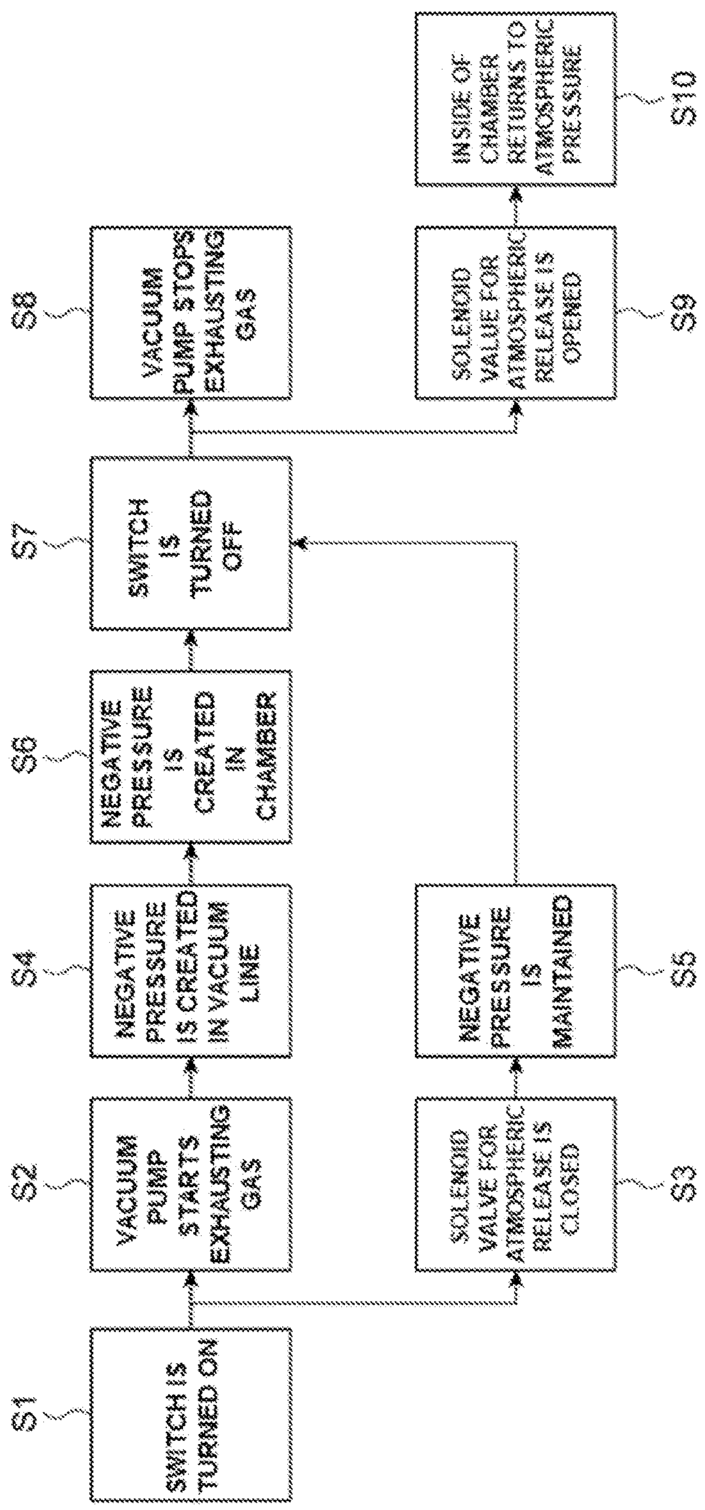
FIG. 5 is a flowchart illustrating an example of an exhaust process and atmospheric release by the degassing apparatus illustrated in FIG. 1.

The exhaust process and the subsequent atmospheric release in the degassing apparatus 1 will now be described with reference to FIG. 5. As illustrated in FIG. 5, first, when the degassing apparatus 1 is switched ON (step S1), the vacuum pump that is the discharge device 50 starts exhausting gas (step S2), and the atmospheric release valve 70 which is a solenoid valve is closed (step S3). Subsequently, a negative pressure is created inside the vacuum piping 40 (step S4). Meanwhile, the atmospheric release valve 70 is kept closed and the negative pressure is maintained. Subsequently, the vacuum pump continues to exhaust gas to create a negative pressure in the reduced-pressure spaces S2 in the degassing modules 10, 20, and 30. When the detector 85 detects that the degree of depressurization in the reduced-pressure spaces S2 falls within a predetermined range, the degassing process by the degassing modules 10, 20, and 30 is performed.

Then, when the degassing process by the degassing modules 10, 20, and 30 is finished, the gas exhaustion by the vacuum pump that is the discharge device 50 is stopped (step S8), and the solenoid valve of the atmospheric release valve 70 is opened to open all of the reduced-pressure spaces S2 to the atmosphere at once, for example, within one minute (step S9). With this step, the inside of the reduced-pressure spaces S2 of the degassing modules 10, 20, 30 instantly returns to the atmospheric pressure (step S10).

In the degassing apparatus 1 according to the present example, the vacuum piping 40 for discharging the atmosphere from the reduced-pressure spaces S2 of the degassing modules 10, 20, and 30 and the atmospheric release piping 60 for opening the reduced-pressure spaces S2 to the atmosphere are provided separately, and after the degassing process in the degassing modules 10, 20, and 30 is finished, the atmospheric release valve 70 is opened to open the reduced-pressure spaces S2 to the atmosphere at once. In the degassing apparatus 1 with this configuration, there is almost no time to cause variations in the degree of depressurization among the degassing modules 10, 20, and 30 when they are opened to the atmosphere, and the occurrence of cross-contamination can be suppressed.

The degassing apparatus 1 further includes the detector 85 for detecting the degree of depressurization in the reduced-pressure spaces S2, and the vacuum piping 40 further has the detection piping section 46 communicatively connected to the detector 85. With this configuration, the degree of depressurization in the reduced-pressure spaces S2 of the degassing modules 10, 20, and 30 can be detected more accurately, and a stable degassing process by the control unit 80 can be achieved. In this configuration, the detector 85 may have a diaphragm 86 for detecting the degree of depressurization, and the detector 85 may be installed in the control unit 80 such that the detection surface of the diaphragm 86 faces downward, towards the bottom plate 2. Vaporized gas may sometimes enter the vacuum piping 40, but the detection surface of the diaphragm 86 of the detector 85 faces downward to prevent gas intrusion from the vacuum piping 40 from remaining attached to the detection surface. In particular, when the gas is a corrosive medium gas, such a configuration can be employed to suppress deterioration of the detection surface and enable stable detection of the degree of depressurization over a long period of time.

The degassing apparatus 1 further includes the bottom plate 2 defining the bottom of the degassing apparatus 1, and the discharge device 50 is arranged on the bottom plate 2 with the anti-vibration means 52 interposed therebetween. The discharge device 50 may sometimes generate vibrations with the pump mechanism or the like and such vibrations may damage the gas permeable membranes (e.g., hollow fiber membranes) that constitute the degassing modules 10, 20, and 30 in the degassing apparatus 1. The vibrations may also cause microbubbles in a test fluid flowing in the degassing modules 10, 20, and 30 to affect the test. However, the provision of such anti-vibration means 52 can suppress transmission of vibrations of the discharge device 50 to other components and prevent damage to the tube 11 which is a gas permeable membrane and the growth of microbubbles in the test fluid. The discharge device 50 may be supported on the bottom plate 2 by a plurality of legs 51 and positioned at a predetermined height from the surface of the bottom plate 2. This configuration can further suppress transmission of vibrations from the discharge device 50 to other components and, in addition, can prevent erosion of the discharge device 50 by a fluid to be degassed in the degassing apparatus 1 even if the fluid leaks from the degassing modules 10, 20, and 30. Even if such leakage occurs, liquid waste disposal can be easily performed. The anti-vibration means 52 may be provided between a plurality of legs 51 and the discharge device 50.

The degassing apparatus 1 may further include the bottom plate 2 defining the bottom of the degassing apparatus 1, and the control unit 80, the atmospheric release valve 70, and the regulating valve 75 may be arranged at a predetermined height from the surface of the bottom plate 2. With this configuration, even if the inspection fluid to be degassed in the degassing apparatus 1 leaks from the degassing modules 10, 20, and 30, erosion of the control unit 80, the atmospheric release valve 70, and the regulating valve 75 by the fluid can be prevented. Even if such leakage occurs, liquid waste disposal can be easily performed.

In the degassing apparatus 1, it is preferable that the vacuum piping 40 and the atmospheric release piping 60 are formed with piping having predetermined chemical resistance, predetermined flexibility, and predetermined gas (oxygen) permeability. More specifically, the vacuum piping 40 and the atmospheric release piping 60 are formed of resin tubes, for example, made of a resin composition containing polyolefin and a thermoplastic elastomer, and the resin tubes have a rubber hardness in the range of 70±30 degrees and an oxygen permeability of 6000 $cc(STP)cm/cm^2/sec/cmHg \times 10^{-10}$ or less. This configuration can prevent erosion of the piping by vaporized gas (chemical resistance), makes it easier to arrange the piping (flexibility), and can easily increase or stabilize the degree of depressurization by the discharge device (gas permeability).

In the degassing apparatus 1, each of the degassing modules 10, 20, and 30 has the housing 13 that includes the opening 13*a* and accommodates the tube unit 12 which is a gas permeable membrane, the lid 14 that hermetically seals the opening 13*a* and allows the tube unit 12 which is a gas permeable membrane to penetrate from the inside toward the outside of the housing 13, and the connector portions 15 and 16 that connect and fix the tube unit 12 to the lid 14 while maintaining the airtightness of the reduced-pressure space S2 in the penetrating region. The connector portions 15 and 16 may include a support member 15*a*, 16*a*, arranged inside the tubular gas permeable membrane to support the tubular gas permeable membrane from the inside when connected and fixed to the lid 14. The support member 15*a*, 16*a* may be a support pipe made of SUS, ceramic, fluororesin, or the like. A structure for improving the strength may be further provided inside the pipe. This configuration can prevent membrane breakage of the tube unit 12 at the fixing and connection portion of the degassing module 10, 20, 30. In particular, when the gas permeable membrane is a tubular hollow fiber membrane, membrane breakage is likely to occur during transportation or due to vibrations, but this configuration can prevent membrane breakage. As a result, the reduced-pressure space S2 separated by the gas permeable membrane can be closed more reliably, so that the depressurization process by the discharge device 50 can be stabilized more.

In the degassing apparatus 1, the atmospheric release piping 60 is arranged above the vacuum piping 40. With this configuration, since the reduced-pressure space is opened to the atmosphere by the atmosphere introduced from above, vaporized gas is less likely to move to other regions, and as a result, cross-contamination can be further suppressed.

The degassing apparatus 1 further includes the regulating valve 75 arranged between the degassing modules 10, 20, and 30 and the discharge device 50 to regulate the degree of depressurization in the reduced-pressure spaces S2, and the control unit 80 performs control to close the regulating valve 75 and stop the operation of the discharge device 50 when the degree of depressurization in the reduced-pressure space S2 is within a predetermined range. With this configuration, the operation of the discharge device 50 can be stopped as necessary to further suppress the vibration-induced damage and the growth of microbubbles.

In the degassing apparatus 1, after the degassing process is finished, the control unit 80 may perform control to open the atmospheric release valve 70 to open the reduced-pressure spaces S2 to the atmosphere at once while the gas discharge operation by the discharge device 50 continues for a predetermined time. With this control, the reduced-pressure spaces can be smoothly opened to the atmosphere by the atmospheric release valve 70.

Although an embodiment of the present invention has been described above, the present invention is not limited to the foregoing embodiment and can be changed or modified as appropriate without departing from the spirit of the present invention.

EXAMPLES

The present invention will be described more specifically below based on test examples, but the present invention is not limited to the following test examples.

[Vibration Test]

As the first test (Test Example 1), a vibration test of the degassing apparatus 1 was performed. As an overview of the vibration test, a malfunction was checked when vibrations were applied to the degassing apparatus 1 by a vibration generator. The degassing apparatus 1 having the configuration illustrated in FIG. 1 and FIG. 2 was used, and resin tubes of the material denoted as P1 below were used for the discharge piping sections 41 to 43, the piping 45 and detection piping section 46 of the vacuum piping 40, and the release piping sections 61 to 63 and the piping 65 of the atmospheric release piping 60. Hard plastic (polypropylene) was used for the discharge assembly section 44 and the release assembly section 64.

The vibration test conditions were linear sweep with a frequency of 50 to 60 Hz, an acceleration of 1 G, a vibration duration of 100 hours, and a temperature of 30° C. or 60° C. during vibrations. The criteria were as follows. The junction in the criteria means a point where the resin tube forming each of the discharge piping sections 41 to 43, the piping 45, and the detection piping section 46 is joined to the discharge assembly section 44, or a point where the resin tube forming each of the release piping sections 61 to 63 and the piping 65 is joined to the release assembly section 64.

[Criteria]

Criterion A No abnormality

Criterion B1 Tube loosened at a junction (at one or more locations)

Criterion B2 Tube disconnected at a connection portion (at one or more locations)

Criterion B3 Tube loosened and disconnected at a connection portion (at one or more locations)

Criterion C Connection portion damaged (unusable)

P1: Styrene thermoplastic elastomer tube (single-wall tube with an outer diameter of 6 mm, an inner diameter of 4 mm, an oxygen permeability coefficient of 200 $cc(STP)cm/cm^2/sec/cmHg \times 10^{-10}$, and a rubber hardness of 65 degrees)

The P1 tubes were produced by the following production method.

(Production Example) 30 Parts by Mass of Polypropylene (Random Copolymer "13T25A" from Flint Hills Resources) and a Styrene Thermoplastic Elastomer (styrene/ethylene/butylene/styrene (SEBS) block copolymer "FG1924 G Polymer" from KRATON CORPORATION) were melted and kneaded in a twin-screw vent extruder with an inner diameter of 30 mm (set temperature 200° C.) and then pelletized. Using a single-wall tube fabrication machine with a plasticizing cylinder (an inner diameter of 20 mm, uniaxial extrusion screw) and a die for tubing, a single-wall tube with an outer diameter of 6 mm and an inner diameter of 4 mm was fabricated by feeding the pellets into the plasticizing cylinder, extruding a tube at a temperature of 200° C., and adjusting the winding speed.

As a result of the vibration test described above, it was confirmed that the criterion was A in the degassing apparatus 1 according to Test Example 1.

[Vacuum Test]

As the next test (Test Example 2), a vacuum test of the degassing apparatus 1 was performed. As an overview of the vacuum test, a malfunction in the operation of the degassing apparatus 1 was checked. The same degassing apparatus as in the vibration test described above was used.

As for the condition of the vacuum test, S1 to S10 in FIG. 5 were set as one cycle and 5000 cycles were repeatedly performed. The degree of vacuum in this test was 0 (zero) KPa (absolute pressure) and the temperature of the vacuum test was 23° C. or 82° C. The criteria were as follows. As visual observation, the "presence" or "absence" of deformation, crushing, or blockage of the resin tube during operation was observed.

[Criteria]

Criterion A No abnormality

Criterion B1 Tube loosened at a junction (at one or more locations)

Criterion B2 Tube disconnected at a connection portion (at one or more locations)

Criterion B3 Tube loosened and disconnected at a connection portion (at one or more locations)

Criterion C Connection portion damaged (unusable)

As a result of the vacuum test described above, it was confirmed that the criterion in the vacuum test was A in the degassing apparatus 1 according to Test Example 2. It was also confirmed in visual observation that there was no deformation, collapse, or blockage of the tube during operation in the degassing apparatus 1 according to Test Example 2.

REFERENCE SIGNS LIST

1 degassing apparatus
2 bottom plate
10, 20, 30 degassing module
11 tube
12 tube unit
13 housing
14 lid
17 discharge port
18 release port
40 vacuum piping
41 to 43 discharge piping section
44 discharge assembly section
46 detection piping section
50 discharge device
51 leg
52 anti-vibration means
60 atmospheric release piping
61 to 63 release piping section
64 release assembly section
70 atmospheric release valve
71, 76 leg
75 regulating valve
80 control unit
85 detector
S1 fluid circulation space
S2 reduced-pressure space

The invention claimed is:

1. A degassing apparatus comprising:

a first degassing module and a second degassing module, each having a gas permeable membrane to separate a fluid circulation space and a reduced-pressure space from each other;

vacuum piping having discharge piping sections continuous to respective discharge ports of the first degassing module and the second degassing module, and a discharge assembly section configured to assemble the discharge piping sections, the vacuum piping being communicatively connected to the respective reduced-pressure spaces of the first degassing module and the second degassing module;

a pump communicatively connected to the vacuum piping and configured to discharge gas in the respective reduced-pressure spaces to atmosphere through the vacuum piping;

atmospheric release piping having release piping sections continuous to respective release ports of the first degassing module and the second degassing module, and a release assembly section configured to assemble the release piping sections, the atmospheric release piping being communicatively connected to the respective reduced-pressure spaces of the first degassing module and the second degassing module;

an atmospheric release valve communicatively connected to the atmospheric release piping and capable of introducing atmosphere into the respective reduced-pressure spaces through the atmospheric release piping; and a control unit configured to control operation of the pump and the atmospheric release valve, wherein when a degassing process is being performed in at least one of the first degassing module and the second degassing module, the control unit performs control to close the atmospheric release valve to perform a process of discharging gas in the respective reduced-pressure spaces by the pump, and after the degassing process is finished, the control unit performs control to open the atmospheric release valve to open each of the respective reduced-pressure spaces to atmosphere at the same time.

2. The degassing apparatus according to claim 1, further comprising a detector for detecting a degree of depressurization in the respective reduced-pressure spaces, wherein the vacuum piping further has a detection piping section communicatively connected to the detector.

3. The degassing apparatus according to claim 2, wherein the detector has a diaphragm for detecting the degree of depressurization, and the detector is installed such that a detection surface of the diaphragm faces downward towards a bottom plate.

4. The degassing apparatus according to claim 1, further comprising a bottom plate defining a bottom of the degassing apparatus, wherein the pump is disposed on the bottom plate with anti-vibration means interposed therebetween.

5. The degassing apparatus according to claim 4, wherein the pump is supported on the bottom plate by a plurality of legs and is positioned at a predetermined height from a surface of the bottom plate.

6. The degassing apparatus according to claim 5, wherein the anti-vibration means is disposed between the legs and the pump.

7. The degassing apparatus according to claim 1, further comprising a bottom plate defining a bottom of the degassing apparatus, wherein at least one of the control unit and the atmospheric release valve is disposed at a predetermined height from a surface of the bottom plate.

8. The degassing apparatus according to claim 1, wherein at least a portion of at least one of the vacuum piping and the atmospheric release piping is formed of a resin tube, and the resin tube has a rubber hardness in a range of 70±30 degrees, and the resin tube has an oxygen permeability of 6000 $cc(STP)cm/cm^2/sec/cmHg \times 10^{-10}$ or less.

9. The degassing apparatus according to claim 1, wherein the first degassing module has a housing having an opening and accommodating the gas permeable membrane in a tubular shape, a lid configured to hermetically seal the opening and allow the gas permeable membrane in a tubular shape to penetrate from inside toward outside of the housing, and a connector portion connecting and fixing the gas permeable membrane in a tubular shape to the lid while maintaining airtightness of the respective reduced-pressure spaces in a region where the gas permeable membrane penetrates, wherein the connector portion includes a support member disposed inside the gas permeable membrane in a tubular shape to support the gas permeable membrane in a tubular shape from the inside when connected and fixed to the lid.

10. The degassing apparatus according to claim 1, wherein the atmospheric release piping is disposed above the vacuum piping.

11. The degassing apparatus according to claim 1, further comprising a regulating valve disposed between the first and second degassing modules and the pump to regulate a degree of depressurization in the respective reduced-pressure spaces, wherein the control unit performs control to close the regulating valve and stop operation of the pump when the degree of depressurization in the respective reduced-pressure spaces is within a predetermined range.

12. The degassing apparatus according to claim 1, wherein after the degassing process is finished, the control unit performs control to open the atmospheric release valve to open each of the respective reduced-pressure spaces to atmosphere at the same time while gas discharge operation by the pump continues for a predetermined time.

13. The degassing apparatus according to claim 2, further comprising a bottom plate defining a bottom of the degassing apparatus, wherein the pump is disposed on the bottom plate with anti-vibration means interposed therebetween.

14. The degassing apparatus according to claim 2, further comprising a bottom plate defining a bottom of the degassing apparatus, wherein at least one of the control unit and the atmospheric release valve is disposed at a predetermined height from a surface of the bottom plate.

15. The degassing apparatus according to claim 3, further comprising a bottom plate defining a bottom of the degassing apparatus, wherein at least one of the control unit and the atmospheric release valve is disposed at a predetermined height from a surface of the bottom plate.

16. The degassing apparatus according to claim 2, wherein at least a portion of at least one of the vacuum piping and the atmospheric release piping is formed of a resin tube, and the resin tube has a rubber hardness in a range of 70±30 degrees, and the resin tube has an oxygen permeability of 6000 $cc(STP)cm/cm^2/sec/cmHg \times 10^{-10}$ or less.

17. The degassing apparatus according to claim 2, wherein the first degassing module has a housing having an opening and accommodating the gas permeable membrane in a tubular shape, a lid configured to hermetically seal the opening and allow the gas permeable membrane in a tubular shape to penetrate from inside toward outside of the housing, and a connector portion connecting and fixing the gas permeable membrane in a tubular shape to the lid while maintaining airtightness of the reduced-pressure space in a region where the gas permeable membrane penetrates, wherein the connector portion includes a support member disposed inside the gas permeable membrane in a tubular shape to support the gas permeable membrane in a tubular shape from the inside when connected and fixed to the lid.

18. The degassing apparatus according to claim 2, wherein the atmospheric release piping is disposed above the vacuum piping.

19. The degassing apparatus according to claim 2, further comprising a regulating valve disposed between the first and second degassing modules and the pump to regulate a degree of depressurization in the respective reduced-pressure spaces, wherein the control unit performs control to close the regulating valve and stop operation of the pump when the degree of depressurization in the reduced-pressure space is within a predetermined range.

20. The degassing apparatus according to claim 2, wherein after the degassing process is finished, the control unit performs control to open the atmospheric release valve to open each of the respective reduced-pressure spaces to atmosphere at the same time while gas discharge operation by the pump continues for a predetermined time.

* * * * *